United States Patent
Tibi

(10) Patent No.: US 12,553,697 B2
(45) Date of Patent: Feb. 17, 2026

(54) SYSTEM AND METHOD FOR TESTING OPTICAL PROXIMITY FUSES

(71) Applicant: RAFAEL ADVANCED DEFENSE SYSTEMS LTD., Haifa (IL)

(72) Inventor: Dov Tibi, Givat Ela (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 4 days.

(21) Appl. No.: 18/847,747

(22) PCT Filed: Dec. 27, 2022

(86) PCT No.: PCT/IB2022/062814
§ 371 (c)(1),
(2) Date: Sep. 17, 2024

(87) PCT Pub. No.: WO2023/175393
PCT Pub. Date: Sep. 21, 2023

(65) Prior Publication Data
US 2025/0198734 A1    Jun. 19, 2025

(30) Foreign Application Priority Data
Mar. 17, 2022   (IL) .......................... 291469

(51) Int. Cl.
*F42C 21/00*    (2006.01)
*F42C 13/02*    (2006.01)
*G01S 7/497*    (2006.01)
*G01S 17/08*    (2006.01)

(52) U.S. Cl.
CPC ............ *F42C 21/00* (2013.01); *F42C 13/023* (2013.01); *G01S 7/497* (2013.01); *G01S 17/08* (2013.01)

(58) Field of Classification Search
CPC ........ F42C 21/00; F42C 13/023; G01S 7/497; G01S 17/08; F41J 5/02
See application file for complete search history.

(56) References Cited

U.S. PATENT DOCUMENTS 3,986,394 A * 10/1976 Greenlees ............... F42C 13/04
                                                                  73/167

FOREIGN PATENT DOCUMENTS

CN    105698618 A  *  6/2016   .............. F42C 21/00
EP    1160536 A1   * 12/2001   .............. G01S 7/486

* cited by examiner

Primary Examiner — Benjamin P Lee
(74) Attorney, Agent, or Firm — Rivka Friedman

(57) ABSTRACT

A system (10) for testing a laser proximity fuse (PF) (12) by simulating a closing velocity to a target along a line of sight (14) includes a static spiral surface (16) and a support arrangement (18) for supporting the proximity fuse (12) with the line of sight (14) directed towards an inside of static spiral surface (16). A folding mirror (20) is driven by a drive motor (22) so as to deflect the line of sight (14) towards progressively closer regions of static spiral surface, thereby simulating a closing velocity. The system can be miniaturized by employing converging optics (24). An alternative embodiment employs a shaped rotor (32) to achieve a similar effect.

9 Claims, 7 Drawing Sheets

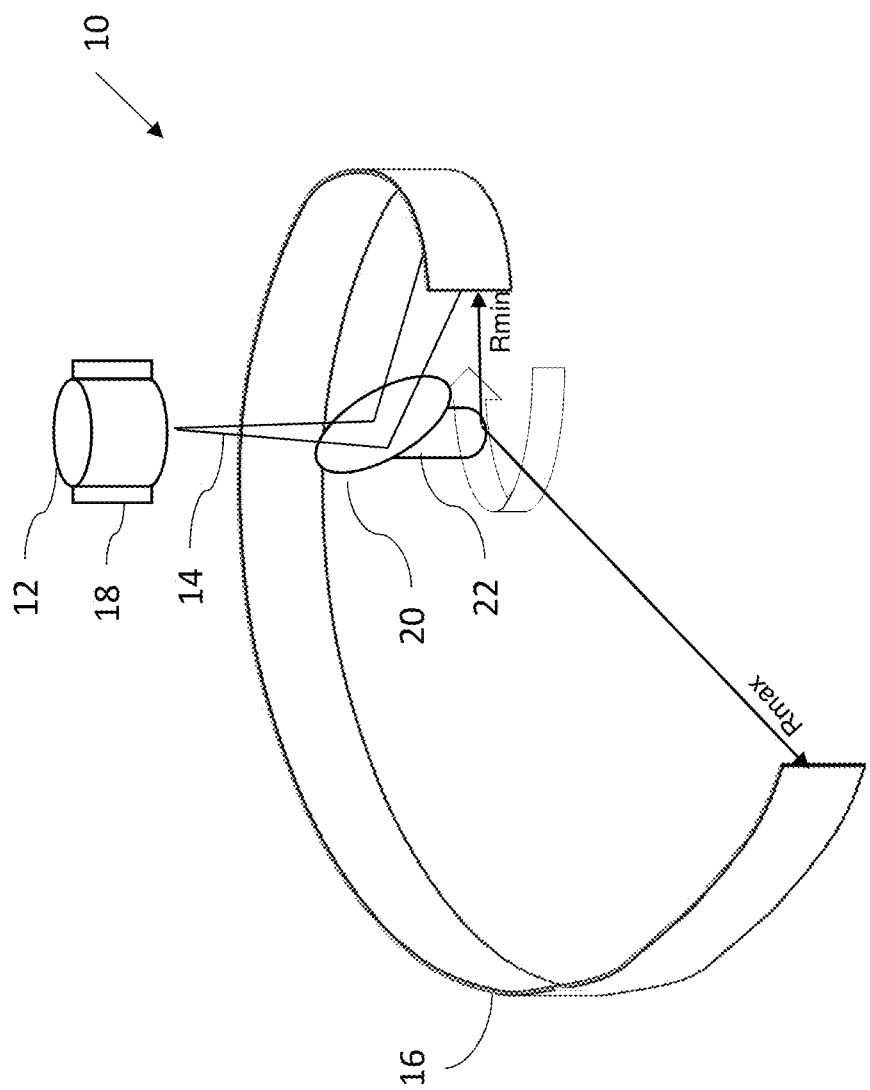

SYSTEM AND METHOD FOR TESTING OPTICAL PROXIMITY FUSES

FIELD AND BACKGROUND OF THE INVENTION

The present invention relates to a system and method for testing laser proximity fuses.

A missile laser proximity fuse (PF) measures the dynamically-changing distance between a missile and a target, and generates an appropriately-timed signal to trigger a warhead (WH) explosion when the distance reaches a predefined distance. A typical usage scenario is represented schematically in FIG. 1, in which the effective closing velocity is sum of the velocity of the proximity sensor V_PF and the velocity of the target V_target. The PF may be required to operate in scenarios in which a closing velocity between a missile fitted with the PF and a target is very high, reaching hundreds of meters per second, and typically needs to implement complex algorithms in order to perform its intended task (for example, ignoring disturbances along the line of sight (LOS) path), details of which are beyond the scope of this document.

During development, testing and production of proximity fuses, there is a need for extensive testing of the operation of the proximity fuse, preferably including an end-to-end testing arrangement to verify proper operation of a design (hardware and software) in real time. The most challenging part of such testing is simulating a closing velocity of hundreds of meters per second between the PF and a target in a cost effective, repeatable and flexible manner.

Conventional approaches for generating the required closing velocity for testing include shell tests, in which a shell is fired so as to pass very close (a few meters away) from the PF being tested. An alternative approach is a steel plates test, in which a steel plate is launched (using explosives) towards a folding mirror and the tested PF. This family of solutions is represented schematically (without a folding mirror) in FIG. 2.

These approaches are not cost effective, do not readily allow testing of a range of varying scenarios, and raise major safety issues that must be addressed.

SUMMARY OF THE INVENTION

The present invention is a system and method for testing a laser proximity fuse by simulating a closing velocity to a target along a line of sight.

According to the teachings of an embodiment of the present invention there is provided, a system for testing a laser proximity fuse by simulating a closing velocity to a target along a line of sight, the system comprising: (a) a static spiral surface; (b) a support arrangement for supporting the proximity fuse with the line of sight directed towards an inside of the static spiral surface; (c) a folding mirror deployed for deflecting the line of sight towards the static spiral surface; and (d) a drive motor deployed for rotating the folding mirror such that the line of sight scans along the static spiral surface, thereby simulating a closing velocity.

According to a further feature of an embodiment of the present invention, the static spiral surface has a curvature corresponding to a segment of an Archimedean spiral.

According to a further feature of an embodiment of the present invention, the static spiral surface has an origin, and wherein the folding mirror is deployed at the origin.

According to a further feature of an embodiment of the present invention, there are also provided converging optics deployed between the support arrangement and the folding mirror, the converging optics having a focal length, and wherein all parts of the static spiral surface are deployed at a light path length from the converging optics that is less than the focal length.

According to a further feature of an embodiment of the present invention, the drive motor is an adjustable drive motor configured to rotate at a range of angular speeds effective to simulate closing velocities over a range extending up to at least 100 meters per second.

There is also provided according to a further feature of an embodiment of the present invention, a method for testing a laser proximity fuse by simulating a closing velocity to a target along a line of sight, the method comprising the steps of: (a) providing the system of any preceding claim; (b) deploying the proximity fuse supported by the support arrangement so that a line of sight of the laser is directed towards the folding mirror; (c) actuating the drive motor so as to rotate the folding mirror; and (d) actuating the proximity fuse synchronously with rotation of the drive motor so that the laser scans along the static spiral surface, thereby simulating a closing velocity.

According to a further feature of an embodiment of the present invention, a visibility-disrupting material or structure is introduced between the folding mirror and the static spiral surface.

There is also provided according to an embodiment of the present invention, a system for testing a laser proximity fuse by simulating a closing velocity to a target along a line of sight, the system comprising: (a) a support arrangement for supporting the proximity fuse with the line of sight directed along an optical axis; (b) a rotor having external surfaces deployed to intersect the optical axis; (c) a drive motor deployed for rotating the rotor to present successive regions of the external surface on the optical axis; and (d) converging optics deployed between the support arrangement and the rotor, the converging optics having a focal length, and wherein the rotor is deployed at a distance from the converging optics that is less than the focal length, wherein the external surfaces of the rotor are shaped such that, when the rotor rotates, a length of a light path from the proximity fuse to the region of the rotor intersected by the optical axis varies so as to simulate a closing velocity.

According to a further feature of an embodiment of the present invention, the rotor has two-fold rotational symmetry.

BRIEF DESCRIPTION OF THE DRAWINGS

The invention is herein described, by way of example only, with reference to the accompanying drawings, wherein:

FIG. 6 is a schematic isometric view of a system for testing a laser proximity fuse by simulating a closing velocity to a target along a line of sight according to the operation principle of FIG. 3;

DESCRIPTION OF THE PREFERRED EMBODIMENTS

The present invention is a system and method for testing a laser proximity fuse by simulating a closing velocity to a target along a line of sight.

The principles and operation of systems and methods according to the present invention may be better understood with reference to the drawings and the accompanying description.

Figure 1:
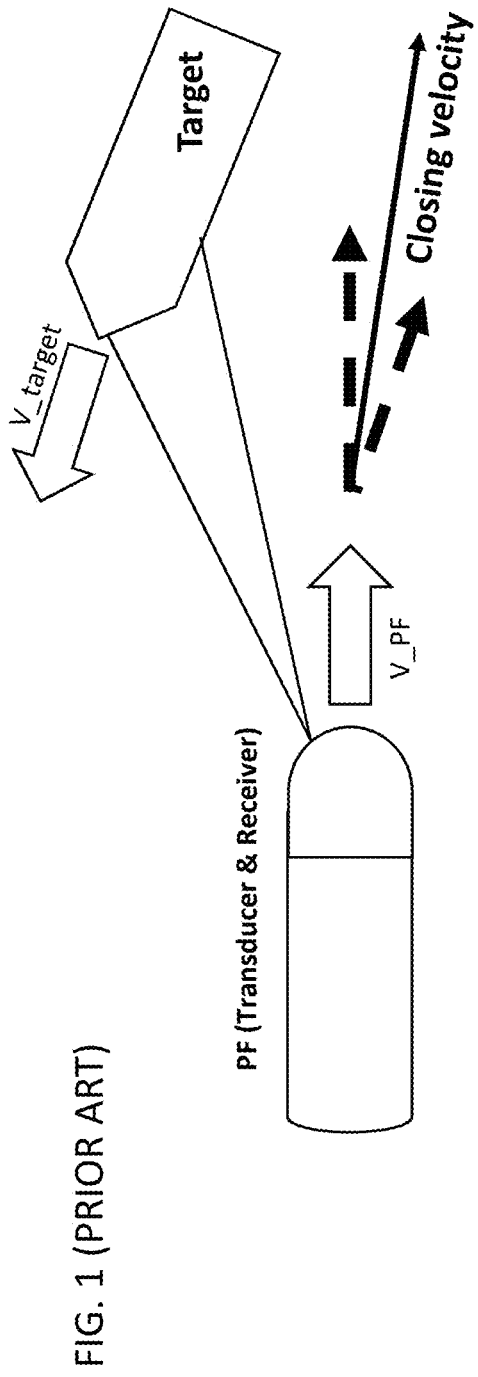
FIG. 1, discussed above, is a schematic representation of a typical usage scenario for a proximity fuse (PF) sensing a target.
Figure 2:
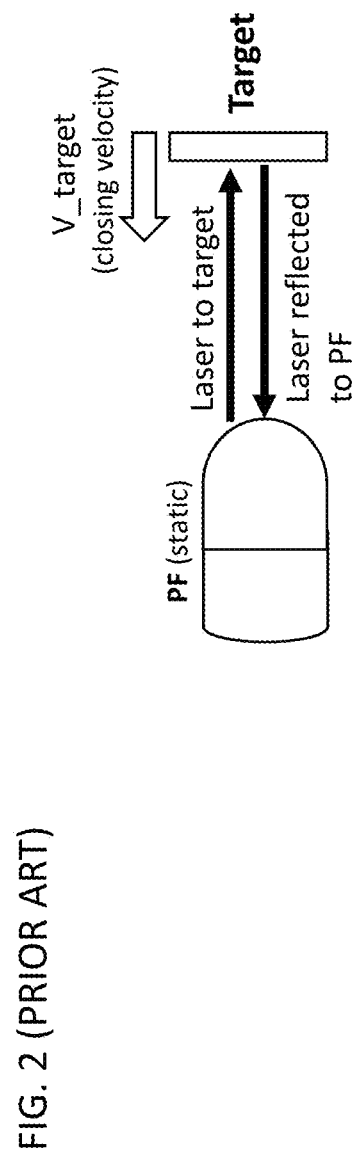
FIG. 2, discussed above, is a schematic representation of a conventional testing scenario for a proximity fuse.
Figure 3:
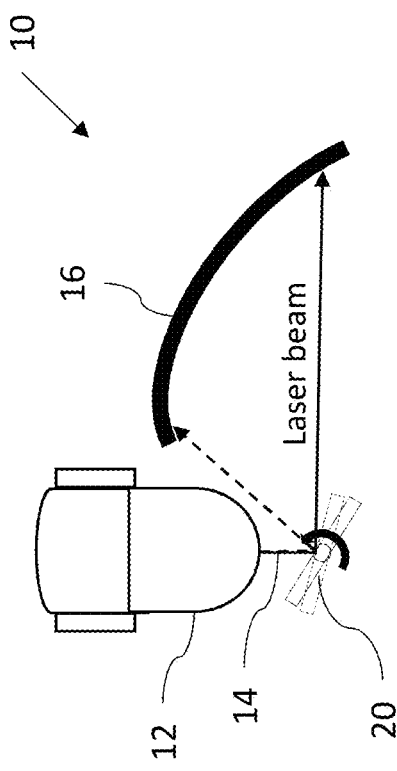
FIG. 3 is a schematic illustration of the operational principle of an embodiment of the present invention, illustrating a rotating folding mirror scanning a line of sight of a proximity fuse along a static spiral surface.
Figure 7A:
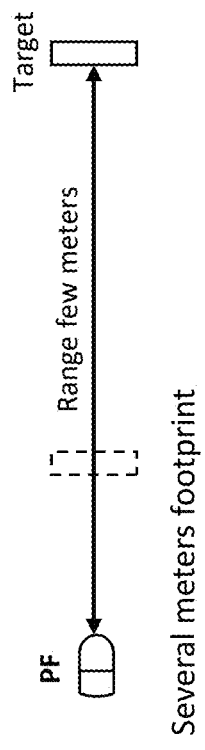
FIGS. 7A and 7B are schematic representations of a range calibration setup for calibrating range measurement of a proximity fuse with and without converging optics, respectively.
Figure 7B:
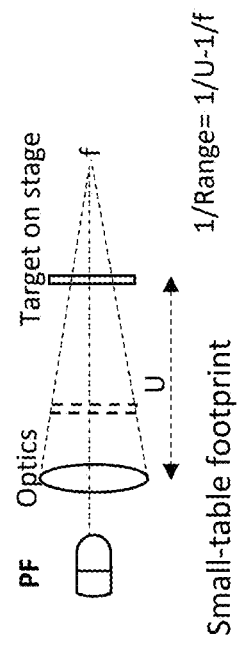
Figure 8:
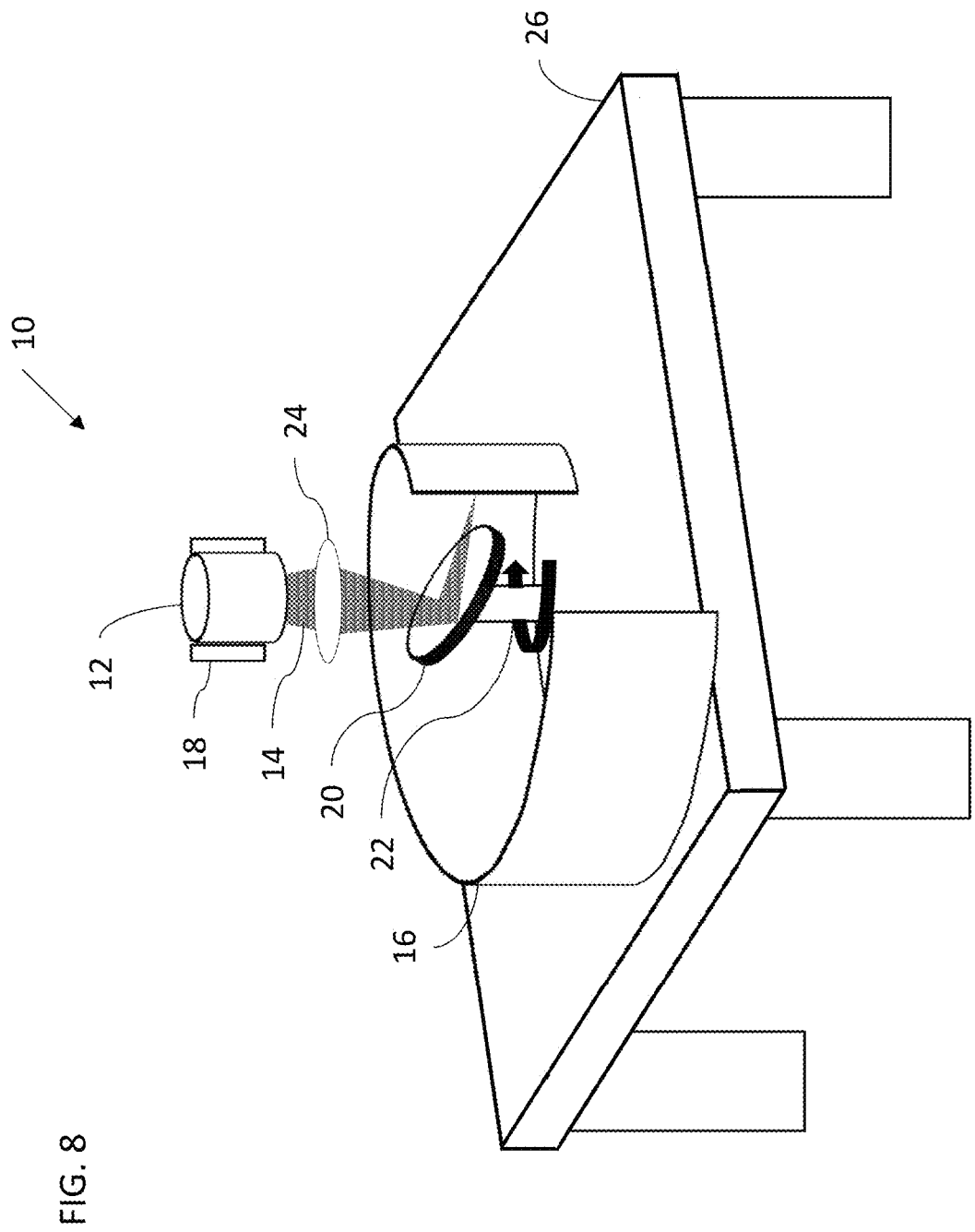
FIG. 8 is a schematic isometric view of a system similar to FIG. 6 but employing converging optics to implement a system with reduced dimensions.

Referring now to the drawings, FIGS. 3-8 illustrate various aspects of a system, generally designated 10, for testing a laser proximity fuse (PF) 12 by simulating a closing velocity to a target along a line of sight 14. Referring generically to FIGS. 3, 6 and 8, in general terms, system 10 includes a static spiral surface 16 and a support arrangement 18 (shown only schematically) for supporting the proximity fuse 12 with the line of sight 14 directed towards an inside of static spiral surface 16. A folding mirror 20 is deployed for deflecting the line of sight 14 towards static spiral surface 16, and a drive motor 22 is deployed for rotating the folding mirror such that the line of sight scans along the static spiral surface, thereby simulating a closing velocity.

In other words, in contrast to the conventional approach of generating rapid relative motion between the PF and an object simulating a target, in this example, the effect of a rapid closing velocity is generated while both the PF and the simulated target are static. Instead, the laser beam that is transmitted from the static PF 12 is reflected from folding mirror 20 to the target 16, and part of the reflected radiation passes back from the target via the mirror to the PF, where it is sensed. As the mirror rotates, the beam hits the target at successive points which correspond to successive distances between the target and the PF. The changing distance with time, simulating a closing velocity, is a function of the rotating velocity and the geometry of the target.

Figure 4:
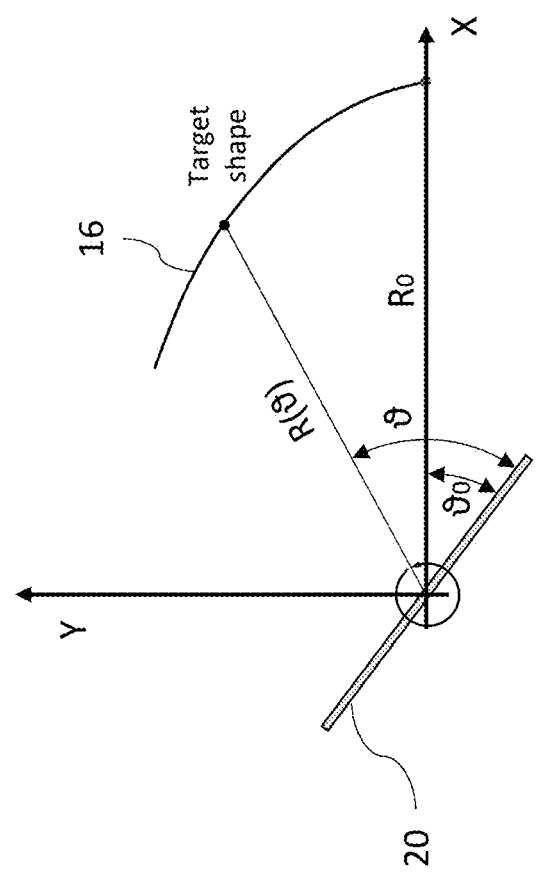
FIG. 4 is a drawing identifying geometrical parameters corresponding to the scenario of FIG. 3, used in a calculation of a shape of the required spiral surface.

In a typical application in which it is desired to simulate a constant closing velocity in the range of hundreds of meters per second using a rotating folding mirror at a constant speed, the effective range to the different regions of the target should vary linearly with the mirror angle. FIG. 4 illustrates the distance from the folding mirror to the target surface as a function of angle R (9). To satisfy the above requirements, the target shape should be spiral according to the equation:

$$R(\vartheta)=R_0-K(\vartheta-\vartheta_0)$$

Figure 5:
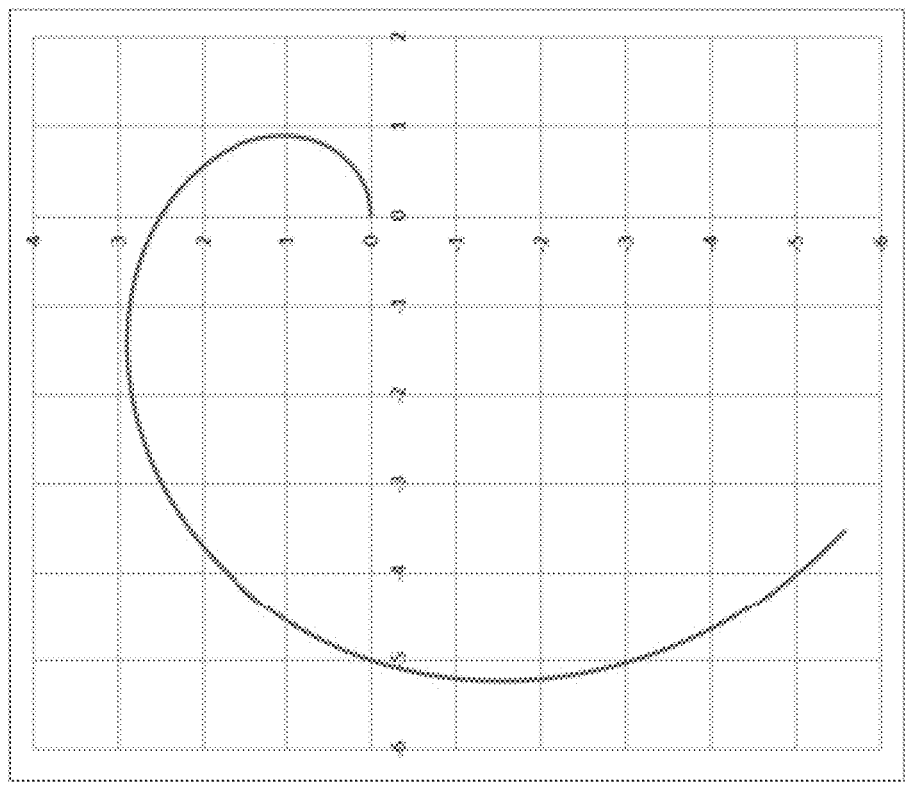
FIG. 5 is a graph illustrating a shape of the required spiral according to one implementation of the present invention.

This generates an Archimedean spiral. The maximum range from which the closing velocity must be simulated will depend on the application, but may in many cases be at least 5 meters, and in some cases, at least 7 meters. FIG. 5 illustrates the geometrical form of an Archimedean spiral of maximum radial distance 7 meters. The angular extent of the segment of the spiral used is no more than 360 degrees, and typically spans at least 180 degrees.

FIG. 6 illustrates schematically the full setup for simulating closing velocities for testing of a PF supported by a support arrangement 18. The example illustrated here employs a spiral form similar to that of FIG. 5, but omits a small part of the spiral closest to the origin of the spiral. In certain particularly preferred implementations, folding mirror 20 is deployed at the origin of the spiral, thereby providing simulation of a constant closing velocity. In other cases, it may be desired to simulate other scenarios, such as the variation of proximity corresponding to a path with a finite miss distance from the target. In this case, an alternative curve is calculated to simulate the desired time-variation of proximity as the folding mirror rotates at a constant speed. All such shapes are referred to herein as a "spiral" in the intuitive sense that, at least for the majority of the curve, the distance from the location of the folding mirror (arbitrarily referred to as the "origin") decreases monotonically along the scanning direction defined by the rotating mirror.

The drive motor 22 is preferably an adjustable drive motor configured to rotate at a range of angular speeds effective to simulate closing velocities over a range extending up to at least 100 meters per second, and in some cases up to supersonic speeds of 500 meters per second or more. As a rough indication of the rotary velocity required by the mirror, taking a spiral which closes from 5 meters to close to zero over 180 degrees, a closing velocity of 100 meters per second would be simulated by a rotary rate of 10 Hz (10 revolutions per second), or 600 rpm.

In order to test a PF using this approach, the PF should be actuated synchronously with rotation of the folding mirror 20, so that the PF "sees" the beginning of a cycle of closing proximity. This can be achieved by suitable circuitry connected to one or more sensor which provides a trigger signal while the folding mirror is between cycles (e.g., directing the PF laser away from the target 16) to ensure synchronous actuation of the PF just prior to the beginning of a cycle. The sensor can be implemented in various ways, including but not limited to, a rotation counter or other sensor associated with drive motor 22, or a photo sensor triggered by a laser beam of the PF projected by the folding mirror as it rotates.

The static spiral surface can be made of any suitable material which emulates the optical properties of a target for the relevant wavelengths. The surface may be supported by any suitable support structure, placed on the outside of the spiral, such as a framework support structure (not shown). Alternatively, a self-supporting structure, such as of bent sheet metal, may be used. The surface is typically implemented as a strip, shaped with the required spiral shape in a plane perpendicular to the axis of rotation of the folding mirror, and with a strip width perpendicular to that plane which is chosen to cover a desired effective field of view of the PF. The angle between the spiral surface and the laser beam is a parameter which may be taken into account during design of the spiral in order to better simulate specific real cases.

Although the spiral surface has been illustrated here as a continuous strip, it should be noted that other implementations, including multiple separate surfaces deployed in stepped relation so as to approximate to the required spiral shape, also fall within the scope of the invention.

The embodiment of the present invention disclosed thus far provides a highly advantageous solution for testing of proximity fuses without requiring use of pyrotechnic elements and high-velocity projectiles. The solution presented thus far does, however, impose space requirements equivalent to a large room, with dimensions greater than the maximum range from which the range to a target needs to be detected. FIGS. 7A and 7B illustrate a further aspect of the present invention which allows miniaturization of the testing system, typically reducing it to a tabletop implementation.

One important phase of manufacturing the PF is the calibration phase. The PF is calibrated in a range of distances up to several meters. Here again, the procedure according to a conventional approach, as illustrated in FIG. 7A, requires distances corresponding to the ranges to be calibrated, therefore requiring a space corresponding to a big room. By introducing converging optics, and by positioning a target at a calculated distance shorter than a focal distance of the optics, it is possible to generate various different apparent ranges while fitting the arrangement into a greatly reduced footprint. For converging optics with a focal length f, the apparent Range from the optics to a target positioned at distance U from the optics satisfies:

$$\frac{1}{\text{Range}} = \frac{1}{U} - \frac{1}{f}$$

This allows calibration of the PF using a small target object moving on a linearly adjustable stage between predefined positions corresponding to the ranges to be calibrated. This dramatically decreases the required footprint for the calibration process.

According to a further aspect of the present invention illustrated in FIG. 8, a similar concept is applied in simulation of the closing velocity for testing. Specifically, the arrangement of FIG. 8 is conceptually similar to that of FIG. 6, but includes converging optics 24 deployed between the support arrangement 18 and the folding mirror 20. All parts of the static spiral surface are deployed at a light path length from the converging optics that is less than a focal length of the converging optics 24, and the position of each part of the spiral is chosen according to the above formula to simulate a constant closing velocity (or any other desired velocity profile). The exact required shape can be derived based on numerical results using optical design software, or can be derived analytically using optical equations, all as will be clear to a person ordinarily skilled in the art. This allows a "tabletop" implementation, as indicated schematically by table 26, with a largest dimension of a footprint of the testing system preferably no greater than 2 meters.

An additional advantage of all of the above systems is that they allow testing of the effect of many kinds of disruptions to the line of sight between the PF and the target. For example, a visibility-disrupting material or structure can be introduced between the folding mirror and the static spiral surface, such as smoke or other airborne particles and/or a camouflage structure deployed over the target, to test the ability of the PF to deal with such disruptions.

The present invention also provides a method for testing a laser proximity fuse by simulating a closing velocity to a target along a line of sight, including the steps of:
(a) providing a testing system as described above;
(b) deploying the proximity fuse 12 supported by the support arrangement 18 so that a line of sight 14 of the laser is directed towards the folding mirror 20;
(c) actuating the drive motor 22 so as to rotate the folding mirror 20; and
(d) actuating the proximity fuse 12 synchronously with rotation of the drive motor 22 so that the laser scans along the static spiral surface 16, thereby simulating a closing velocity.

If desired, a visibility-disrupting material or structure, such as smoke/airborne particles and/or a camouflage structure, can be introduced between the folding mirror and the static spiral surface as part of the testing.

Figure 9:
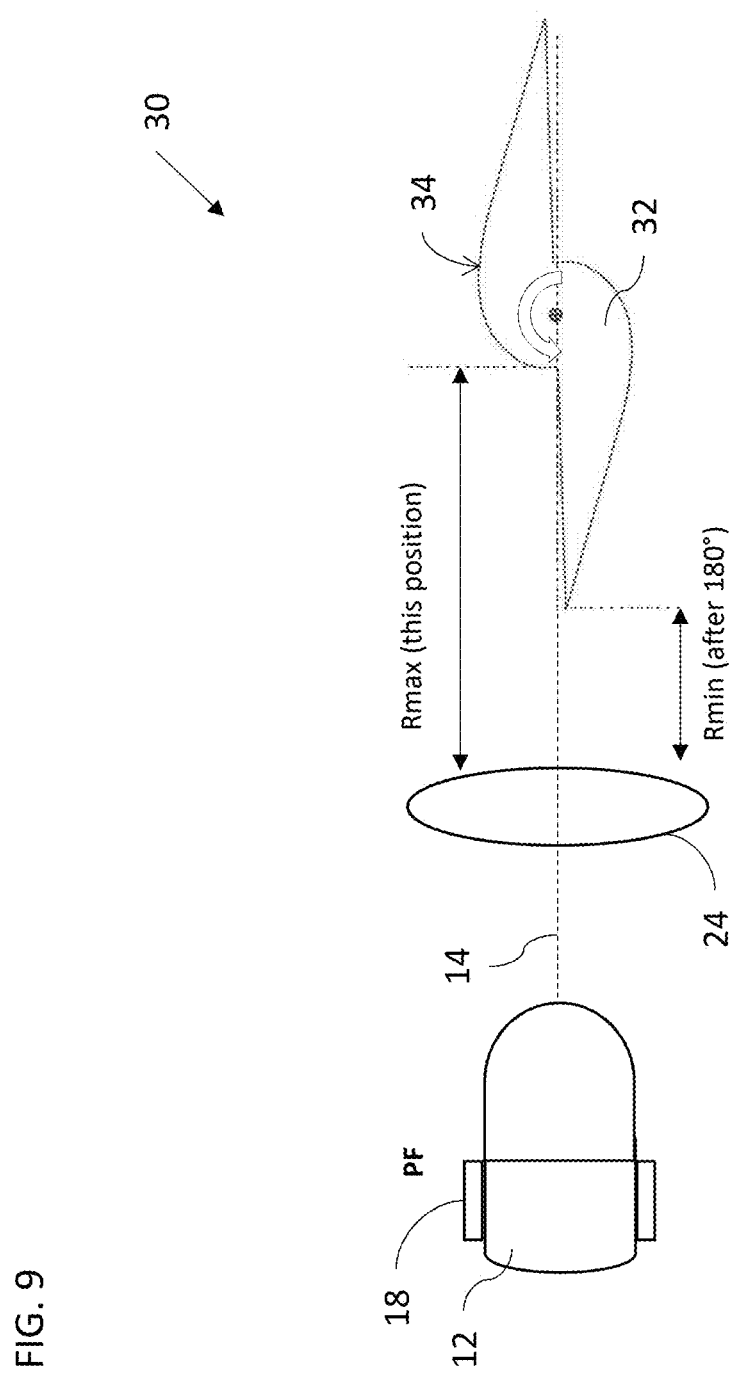
FIG. 9 is a schematic isometric view of a system for testing a laser proximity fuse by simulating a closing velocity to a target along a line of sight according to an alternative aspect of the present invention employing a spinning rotor having spiral surfaces.

Turning finally to FIG. 9, there is illustrated an alternative embodiment of the present invention which, instead of employing a rotating folding mirror, employs a shaped rotor to provide surfaces at varying apparent ranges from the proximity fuse to simulate a closing velocity.

Thus, FIG. 9 illustrates a system, generally designated 30, for testing a laser proximity fuse 12 by simulating a closing velocity to a target along a line of sight 14. System 30 includes a support arrangement 18 for supporting the proximity fuse 12 with the line of sight 14 directed along an optical axis, a rotor 32 having external surfaces 34 deployed to intersect the optical axis, a drive motor (beneath the rotor and therefore not visible in this view) deployed for rotating the rotor to present successive regions of the external surface on the optical axis, and converging optics 24 deployed between the support arrangement and the rotor. The rotor 32 is deployed at a distance from the converging optics 24 that is less than a focal length of the converging optics. The external surfaces 34 of rotor 32 are shaped such that, when the rotor rotates, a length of a light path from proximity fuse 12 to the region of the rotor intersected by the optical axis varies so as to simulate a closing velocity.

In the particularly preferred implementation illustrated here, rotor 32 has two-fold rotational symmetry, such that the full range of closing distances is covered by a rotation of 180 degrees by the rotor, after which it repeats. This ensures that the rotor is balanced.

As above, the use of converging optics 24 allows for miniaturization of the structure, and also changes the mapping of position to effective range such that a shape such as that illustrated can provide the full required variation of ranges for simulating the required closing velocities while maintaining a small, typically "tabletop" size of the testing system, typically with a footprint with a maximum dimension of no more than about 2 meters. Here too, the exact required shape can be derived based on numerical results using optical design software, or can be derived analytically using optical equations, all as will be clear to a person ordinarily skilled in the art.

It will be appreciated that the above descriptions are intended only to serve as examples, and that many other embodiments are possible within the scope of the present invention as defined in the appended claims.

What is claimed is:

1. A system for testing a laser proximity fuse by simulating a closing velocity to a target along a line of sight, the system comprising:
    (a) a static spiral surface;
    (b) a support arrangement for supporting the proximity fuse with the line of sight directed towards an inside of the static spiral surface;
    (c) a folding mirror deployed for deflecting the line of sight towards the static spiral surface; and
    (d) a drive motor deployed for rotating said folding mirror such that the line of sight scans along the static spiral surface, thereby simulating a closing velocity.

2. The system of claim 1, wherein said static spiral surface has a curvature corresponding to a segment of an Archimedean spiral.

3. The system of claim 1, wherein said static spiral surface has an origin, and wherein said folding mirror is deployed at said origin.

4. The system of claim 1, further comprising converging optics deployed between said support arrangement and said folding mirror, said converging optics having a focal length, and wherein all parts of said static spiral surface are deployed at a light path length from said converging optics that is less than said focal length.

5. The system of claim 1, wherein said drive motor is an adjustable drive motor configured to rotate at a range of angular speeds effective to simulate closing velocities over a range extending up to at least 100 meters per second.

6. A method for testing a laser proximity fuse by simulating a closing velocity to a target along a line of sight, the method comprising the steps of:
    (a) providing the system of any one of the preceding claims;
    (b) deploying the proximity fuse supported by said support arrangement so that a line of sight of the laser is directed towards said folding mirror;
    (c) actuating the drive motor so as to rotate the folding mirror; and
    (d) actuating the proximity fuse synchronously with rotation of the drive motor so that the laser scans along said static spiral surface, thereby simulating a closing velocity.

7. The method of claim 6, further comprising introducing a visibility-disrupting material or structure between said folding mirror and said static spiral surface.

8. A system for testing a laser proximity fuse by simulating a closing velocity to a target along a line of sight, the system comprising:
    (a) a support arrangement for supporting the proximity fuse with the line of sight directed along an optical axis;
    (b) a rotor having external surfaces deployed to intersect the optical axis;
    (c) a drive motor deployed for rotating said rotor to present successive regions of said external surface on said optical axis; and
    (d) converging optics deployed between said support arrangement and said rotor, said converging optics having a focal length, and wherein said rotor is deployed at a distance from said converging optics that is less than said focal length,
wherein said external surfaces of said rotor are shaped such that, when said rotor rotates, a length of a light path from the proximity fuse to the region of the rotor intersected by the optical axis varies so as to simulate a closing velocity.

9. The system of claim 8, wherein said rotor has two-fold rotational symmetry.

\* \* \* \* \*